April 30, 1957  J. F. WALKER  2,790,755
DISTILLATION AND FRACTIONAL CONDENSATION OF FORMALDEHYDE
Filed Aug. 18, 1953
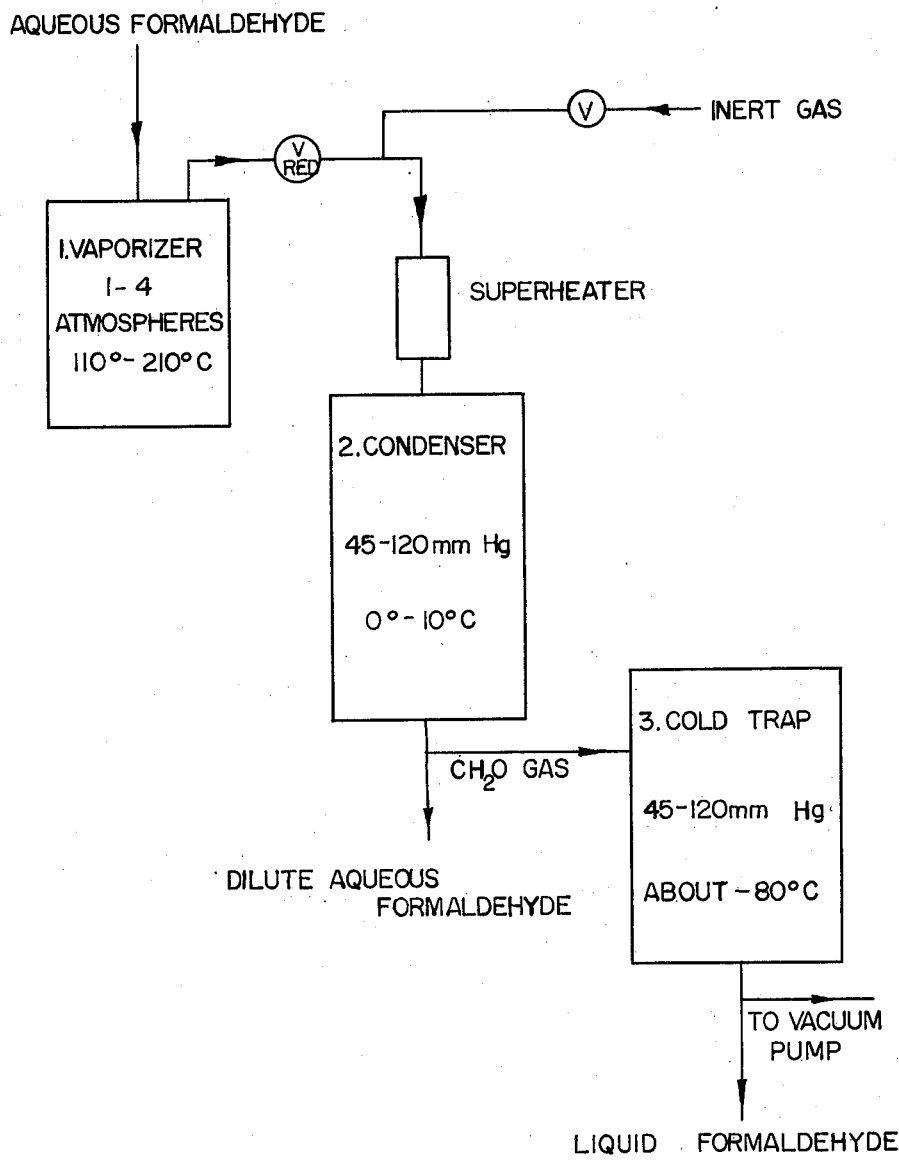
INVENTOR.
JOSEPH FREDERIC WALKER
ATTORNEY

United States Patent Office 2,790,755
Patented Apr. 30, 1957

2,790,755

DISTILLATION AND FRACTIONAL CONDENSATION OF FORMALDEHYDE

Joseph Frederic Walker, Lewiston, N. Y., assignor to E. I. du Pont de Nemours and Company, Wilmington, Del., a corporation of Delaware Application August 18, 1953, Serial No. 375,057

11 Claims. (Cl. 202—69)

This invention relates to the purification of formaldehyde and more particularly to the production of substantially anhydrous formaldehyde monomer from aqueous solutions containing the hydrated and polymerized compound.

Formaldehyde, the first member of the aldehyde series, is used in large quantities industrially, being available primarily as a 37% aqueous solution. Methanol is usually added to this solution to prevent excessive polymerization. The monomer is relatively unknown because of its great reactivity and remains practically a laboratory curiosity. The same reactivity, however, indicates the value of the material, particularly in the production of polymers. Pure dry formaldehyde is a colorless gas of characteristic odor which may be condensed to a liquid boiling at about $-19°$ C. and freezing at about $-118°$ C. The gas may be obtained by heating the solid hydrated polymer, paraformaldehyde, which contains 95–96% available formaldehyde, or the polyoxymethylenes. As formed in this manner, the compound contains small quantities of water and polymerizes rapidly below 100° C. In addition, the polymerized formaldehyde solids are relatively expensive and, if used as source of the gas, greatly increase the cost of the latter. The dry gas may be obtained by distillation of pure anhydrous liquid formaldehyde. Attempts to remove water from the gas by chemical agents have been unsuccessful because the agents uniformly serve as polymerization catalysts.

Distillation of aqueous formaldehyde solutions is well known to the art, a summary of the work in this field being found in chapter 6 of the American Chemical Society Monograph Formaldehyde, 2nd edition (1953) by J. F. Walker, Reinhold Publishing Corp. Generally distillation processes carried out at atmospheric pressure yield solutions more dilute than the original dilute solutions. However, British Patent 654,746 (1948) shows the concentration of aqueous formaldehyde by the vaporization of dilute solutions at an unspecified pressure and subsequent condensation of the gas at reduced pressure. The German patent 503,180 shows distillation of an aqueous formaldehyde solution and partial condensation of the resulting vapors into an aqueous fraction and a concentrated formaldehyde gas which is condensed at normal pressure to a solid polymer containing up to 93% $CH_2O$ and 7% water.

One distillation process which may produce substantially anhydrous formaldehyde is that of Bond, U. S. Patent 1,905,033. This patent shows the distillation of aqueous solutions of formaldehyde under pressure at temperatures somewhat above the normal boiling point of the solution employed. Condensation of the evolved vapors is subsequently effected under pressure of one atmosphere or greater. Some anhydrous gas is formed by this procedure but greatest efficiency is obtained in the concentration of dilute solutions.

A primary object of this invention is development of a process for producing substantially anhydrous monomeric formaldehyde. A further object is development of a distillation process for producing the desired monomer. Another object is development of a distillation process for producing substantially anhydrous formaldehyde monomer in a relatively cheap and efficient manner. Still further objects of the invention will be evident from the remainder of the specification.

I have found that the objects of this invention may be achieved by a process which includes the steps of vaporizing aqueous formaldehyde of commercial concentration at atmospheric or higher pressure, superheating the vapors formed, fractionally condensing water from the vapors at a low temperature and pressure and collecting the resulting monomeric gas. The superheating step may, if desired, be combined with the vaporization. It is preferable, however, that superheating be utilized, thereby dissociating any methylene glycol into water and formaldehyde. The glycol is indicated by the studies of Hall and Piret, Ind. & Eng. Chem. 41, 1277–86 (1949) as being present to some extent in the vapors between about 100° and 110° C.

Applicant's process is illustrated by the accompanying drawing. As indicated, aqueous formaldehyde, whose concentration is preferably between about 37 and 60% by weight, is fed to vaporizer 1 in which the formaldehyde is gasified at a pressure of 1 to 4 atmospheres. The formaldehyde and water vapor then pass through the reducing valve and superheater to condenser 2 operating at a 45 to 120 mm. pressure. If desired an inert gas may be fed to the vapors at this point as indicated. Water vapor and a fraction of the formaldehyde is condensed in 2 at a temperature of about 0° to 10° C. yielding dilute aqueous formaldehyde as a condensate. The monomeric formaldehyde vapor then passes to the refrigerated cold trap 3 yielding substantially pure liquid formaldehyde which may be further purified by vacuum distillation if desired.

Apparatus necessary for carrying out my process may be formed from well-known and conventional parts connected in obvious series. Accordingly structural details are not indicated in the illustration. The vaporizer 1 may consist of a closed steel pot, a pressure still or a flash vaporizer. The condenser 2 is an ordinary condenser or scrubber under vacuum. The cold trap 3 is an ordinary refrigerated condenser or cold trap. Valves, receivers, heating and cooling means, etc. are such as would be obvious to a chemical engineer.

By way of illustrating my invention the following examples are given.

EXAMPLE 1

A series of experiments was carried out on a low methanol aqueous formaldehyde solution having a concentration of approximately 37%. This material was vacuum distilled in a 3-gal. stainless steel pot. Vapors were condensed in a Liebig-type spiral condenser made up from 12 feet of $5/16$ inch stainless steel tubing feeding into a heavy-walled, 4-liter Erlenmeyer flask receiver. Vapors leaving the receiving flask passed through a a scrubber flask in which the gases were bubbled through about 2 inches of pure water and then into a large Cenco pump. Although various pressures ranging from 45 to 150 mm. were measured at the scrubber exit, measurements in the pot indicated a constant pressure of 150 to 160 mm. This pressure was evidently determined by the rate of distillation, which was relatively constant, and the rate at which the vapor escaped through the orifice tube exit from the pot. The pressure measured at the scrubber exit was the pressure at which condensation took place, the orifice exit acting as a pressure reducing valve. The temperature of the gases leaving the pot ranged from 53° to 69° in all experiments, the latter temperature being reached at the end of the run. The vapor temperature was 63°—65° C. throughout most of the distillation. The cooling water ranged in temperature from between about 2° to about 10° C. In each experiment three or four separate distillates were collected at the condenser and separately analyzed. The total quantities of water and formaldehyde were obtained by addition. The concentration of formaldehyde in the distillate increased as the process continued.

An examination of the results obtained in these experiments shows that although practically all the water in the original formaldehyde solution was collected in the receiver as dilute formaldehyde, an appreciable portion of the formaldehyde in the vapors was absorbed by the scrubbers while an additional quantity escaped through the vacuum pump. Polymerization of a portion of this escaping gas in the pump made it necessary to clean the pump mechanism at frequent intervals.

Table 1 indicates the relative efficiency of fractional condensation of the Liebig condenser at various pressures. This is measured by the weight fraction of water and formaldehyde leaving the condenser in the vapor phase. The values are obtained by the difference between quantity of formaldehyde solution distilled and the total weight of distillate.

In the final stage of Experiment 1 the pressure was adjusted to 145–155 mm. but only 13 grams of formaldehyde were collected under such conditions in the scrubber.

*Table I*

FRACTIONAL CONDENSATION OF $CH_2O \cdot H_2O$ VAPOR

| Expt. No. | Pressure at Scrubber Exit, mm. | Wt. Composition of Vapor in Grams | | | | | | Percent Not Condensed | |
|---|---|---|---|---|---|---|---|---|---|
| | | Entering Condenser | | | Leaving Condenser | | | | |
| | | $CH_2O$ | $H_2O$ | Percent $CH_2O$ | $CH_2O$ | $H_2O$ | Percent $CH_2O$ | $CH_2O$ | $H_2O$ |
| 1 | 45–60 | 1,664 | 8,330 | 17 | 759 | 139 | 85 | 49 | 2 |
| 2 | 50–60 | 1,288 | 7,860 | 14 | 478 | 145 | 77 | 37 | 2 |
| 3 | 110–115 | 1,321 | 8,120 | 14 | 273 | 0 | 100 | 21 | 0 |
| 4 | 112–120 | 1,620 | 8,523 | 16 | 480 | 0 | 100 | 30 | 0 |
| 5 | 140–145 | 1,275 | 7,975 | 14 | 72 | 112 | 40 | 6 | 1 |

EXAMPLE 2

An experiment was repeated using the procedure of Example 1. A gasket in the pot developed a leak admitting considerable inert gas to the system. In this experiment, Number 6, 11.1% of the total charge was absorbed by the scrubbers and 9.8% was lost through the pump, a total of 20.9%. Similar totals for other experiments are: Exp. 2, 10.4%; Exp. 3, 5.8%; Exp. 4, 10.6%; and Exp. 5, 2.5%. Presence of the inert gas therefore greatly increased the efficiency of the process. The pressure in this distillation ranged from 50–70 mm. for the first distillate fraction to 118–140 mm. for the last two fractions. Fractional condensation results are indicated in Table II.

*Table II*

FRACTIONAL CONDENSATION IN PRESENCE OF INERT GAS

| Component | Entering Condenser | Leaving Condenser |
|---|---|---|
| $CH_2O$ | 2,012 | 982 |
| $H_2O$ | 7,801 | 296 |
| Percent $CH_2O$ | 20.3 | 77 |

Not condensed: 49% $CH_2O$ and 4% $H_2O$.

EXAMPLE 3

The two previous examples show processes in which aqueous formaldehyde solutions were formed and preferred pressure ranges. To produce anhydrous material additional experiments were run, Experiments 7 and 8.

A 60% formaldehyde solution was dropped from a heated feed tank into a stainless steel coil held at a temperature of 180°–210° C. and flash vaporized at ambient pressure. The vapors were then passed through a reducing valve into an annular condenser in which the pressure was 100 mm. Hg. This condenser was cooled to 0° C. with ice and water. Actually two condensers were employed in series but the second proved unnecessary. The vapors leaving the condenser were passed into a glass receiver chilled to −80° C. and the monomeric formaldehyde condensed. The liquid monomer was substantially anhydrous, containing only about 1% water, and polymerized slowly on standing at −80° C. On vacuum distillation of the fresh material at −75° C., pure anhydrous liquid formaldehyde containing 0 to 60 p. p. m. $H_2O$ was obtained.

Data from Experiments 7 and 8 are summarized in Table III.

*Table III*

PRODUCTION OF ANHYDROUS MONOMER

| Expt. No. | Grams Feed, Hr. | Percent $CH_2O$ | Condensate | | Product | |
|---|---|---|---|---|---|---|
| | | | Wt. Percent of Feed | Percent $CH_2O$ | Wt. Percent of Feed | Percent $H_2O$ |
| 7 | 160 | 61.0 | 56.4 | 34.8 | 23.7 | 1.0 |
| 8 | 134 | 56.7 | 49.1 | 39.3 | 30.5 | 0.9 |

The data of Table III do not give a complete balance on formaldehyde and water. The discrepancy is due chiefly to the inefficiency of the low temperature receiver as a condenser for monomer. Approximately 30% of the formaldehyde was lost in Experiment 7 although about 95% of the water was accounted for. In Experiment 8 only about 12% of the HCHO was lost. Purification of the crude product was carried out after about 16 hours storage at −80° C. The pure monomeric liquid was equivalent to about two-thirds of the crude. A better yield could be obtained by immediate purification of the product to avoid gradual polymerization.

In carrying out the process of the foregoing examples several conditions enhancing fractional condensation must be kept in mind: (1) condensation temperature should be at a minimum; (2) the period of exposure of condensate to uncondensed vapors should be at a minimum; (3) pressure utilized should also be minimal; and (4) the concentration of formaldehyde in the vapors should be at a maximum.

Item (1) is important since the rate of hydration which controls solution of formaldehyde gas in condensate decreases with decreasing temperature. The minimum practical temperature will be dictated by economics. The importance of item (2) is evident in the necessity for exposing vapors to possible solution in water for the shortest possible time.

Item (3), minimum pressure for the condensing step, is the major factor in determining the efficiency of the process. As indicated by Table I, this efficiency falls off greatly above 120 mm. with most efficient water removal occurring in the pressure range of 100–120 mm. Lower pressures are about as efficient and permit more formaldehyde to remain uncondensed in the condensation step. A pressure below 50 mm. or even below 100 is, however, not practicable for large scale operations because of the expense involved. A range of 100–120 mm. is less expensive to maintain and for that reason is preferred. Pressures of above 125 mm. can as indicated by the table be used but with less efficiency than pressures within the preferred range. The effect of the inert gas as shown in Example 2 may possibly be explained on the basis that the inert gas lowers the various partial pressures within the mixture. However, too high an inert gas pressure must be avoided because the larger the percentage of gas the more difficult it will be to remove water vapors from the gaseous product.

Item (4), obtaining the maximum concentration of formaldehyde in vapors, is desirable as indicating a reduced water content. Too great a concentration in the vapors must be avoided to prevent excessive polymerization. A value of 40–60% is not too high, as shown by the examples and these values are preferable. A range of about 10–70% is however tolerable.

The examples cited show concentrations of formaldehyde in the original solution of between about 37%, the usual commercial figure, and about 60%. The application of the process is not restricted to material of these concentrations. Solutions as dilute as 10% or even lower may be utilized but limit the efficiency of the procedure. In like manner no strict upper boundary on concentration is indicated. The higher the concentration, however, the more desirable the use of pressure in the initial distillation step to prevent formation of the solid paraformaldehyde, the substance produced upon vacuum distillation of aqueous formaldehyde. The upper value of the pressure that can be advantageously utilized in this first step is limited by the tendency of the materials to undergo the Cannizzaro reaction at high pressures, forming methanol and formic acid. About 9% of the formaldehyde is thus lost at 100 lbs. pressure but only about 2% at 60 lbs. Sixty pounds or about four atmospheres is accordingly a desirable upper limit.

Since the distillates formed in the condensation step increase in concentration as the distillation proceeds, recycling of the latter condensed solutions may be utilized. The first distillates can also be treated in this manner but, because of their lower concentration, tend to detract from process efficiency. In recyclization all or part of the distillate is merely returned to the evaporator. The cycle may be carried out either continuously or intermittently, that is in batches.

Other modifications of my process will be evident to those skilled in the art. For example, in the above experiments cooling has been shown as accomplished by ice water in a condenser jacket. Since gaseous formaldehyde monomer dissolves but slowly in cold formaldehyde solutions, internal cooling by means of a formaldehyde spray is possible. The resulting scrubbing action would achieve more efficient operation since no polymer would be formed on the walls of the condenser. The condenser required is merely a conventional distilling or scrubbing column.

In the following claims the term "substantially anhydrous formaldehyde" refers to formaldehyde with a water content of about 1% or less, the term "anhydrous," unqualified, being restricted to use with material containing only a few p. p. m. of water.

Having now described my invention, I claim:

1. The method of producing formaldehyde with a water content of not greater than 1% from an aqueous solution thereof which comprises vaporizing said solution at a pressure of between about one and four atmospheres, reducing the pressure on the resultant water-formaldehyde vapor to between 45 and 120 mm. Hg, fractionally condensing water from said vapor by chilling it to a temperature between the condensation temperature of formaldehyde and $+10°$ C. and subsequently collecting the substantially anhydrous monomeric formaldehyde remaining after the condensation of the water.

2. The method of claim 1 in which the pressure on the resultant water-formaldehyde vapor is reduced to about 100–120 mm. of Hg and the temperature at which it is chilled is around $0°$–$10°$ C.

3. The method of claim 1 in which the initial concentration of the formaldehyde in the solution is between about 10 and 60%.

4. The method of claim 1 in which an inert gas is introduced into the water-formaldehyde vapor.

5. The method of claim 1 in which the water-formaldehyde vapors are superheated to a temperature of $110°$–$210°$ C. before the fractional condensation of water vapor therefrom to dissociate any methylene glycol present.

6. The method of producing substantially anhydrous formaldehyde which comprises flash vaporizing at a temperature of between about $110°$ and about $210°$ C. and at a pressure of between about one and four atmospheres an aqueous solution of formaldehyde, reducing the pressure on the resulting vapor to a value between 45 and 120 mm. Hg, condensing water from the vapor at the reduced pressure at a temperature of around $0$–$10°$ C. and collecting the substantially anhydrous monomeric formaldehyde remaining after the condensation of water.

7. The method of claim 6 in which the reduced pressure at which the water is condensed is between about 50 and 120 mm. of Hg.

8. The method of claim 6 in which said substantially anhydrous monomeric formaldehyde is collected by condensation at the temperature of Dry Ice.

9. The method of producing substantially anhydrous formaldehyde from vapors containing both water and formaldehyde which comprises fractionally condensing substantially all the water from said vapors at a pressure not greater than about 120 mm. of Hg and a temperature not above about $10°$ C. and subsequently condensing the vapors from which substantially all the water has been removed.

10. The method of producing substantially anhydrous formaldehyde from vapors containing both water and formaldehyde which comprises fractionally condensing substantially all the water from said vapors at a pressure not greater than about 120 mm. of Hg and a temperature not above about $10°$ C.

11. The method of producing anhydrous formaldehyde from an aqueous solution thereof which comprises vaporizing said solution at a pressure between about one and four atmospheres, reducing the pressure on the resultant vapors to between about 100 and 120 mm. of Hg, condensing water from said vapors at a temperature of around $0$–$10°$ C., condensing the formaldehyde vapor remaining after the condensation of water therefrom and subsequently vacuum distilling the resultant formaldehyde condensate at around $-75°$ C.

References Cited in the file of this patent

UNITED STATES PATENTS

| Number | Name | Date |
|---|---|---|
| 915,946 | Ellis et al. | Mar. 23, 1909 |
| 2,153,526 | Walker | Apr. 4, 1939 |
| 2,452,415 | Wong | Oct. 26, 1948 |
| 2,460,592 | Miller | Feb. 1, 1949 |
| 2,527,655 | Pyle et al. | Oct. 31, 1950 |
| 2,529,622 | Michael | Nov. 14, 1950 |
| 2,565,569 | McCants | Aug. 28, 1951 |
| 2,675,346 | MacLean | Apr. 13, 1954 |